US011145111B2

(12) United States Patent
Jones et al.

(10) Patent No.: US 11,145,111 B2
(45) Date of Patent: Oct. 12, 2021

(54) VOLUMETRIC SLICER

(71) Applicant: Intuitive Research and Technology Corporation, Huntsville, AL (US)

(72) Inventors: Michael Jones, Athens, AL (US); Kyle Russell, Huntsville, AL (US); Chanler Crowe Cantor, Madison, AL (US); Michael Yohe, Meridianville, AL (US)

(73) Assignee: Intuitive Research and Technology Corporation, Huntsville, AL (US)

( * ) Notice: Subject to any disclaimer, the term of this patent is extended or adjusted under 35 U.S.C. 154(b) by 0 days.

(21) Appl. No.: 16/787,457

(22) Filed: Feb. 11, 2020

(65) Prior Publication Data

US 2020/0175746 A1   Jun. 4, 2020

Related U.S. Application Data

(63) Continuation-in-part of application No. 16/703,012, filed on Dec. 4, 2019.

(60) Provisional application No. 62/803,838, filed on Feb. 11, 2019, provisional application No. 62/774,965, filed on Dec. 4, 2018.

(51) Int. Cl.
*G06T 15/08* (2011.01)
*G06T 15/80* (2011.01)
*G06T 15/06* (2011.01)

(52) U.S. Cl.
CPC .............. *G06T 15/08* (2013.01); *G06T 15/06* (2013.01); *G06T 15/80* (2013.01)

(58) Field of Classification Search
CPC .......... G06T 15/08; G06T 15/06; G06T 15/80
See application file for complete search history.

(56) References Cited

U.S. PATENT DOCUMENTS

| | | | |
|---|---|---|---|
| 6,892,090 B2 | 5/2005 | Verard et al. | |
| 6,947,039 B2 | 9/2005 | Gerritsen et al. | |
| 7,894,663 B2 | 2/2011 | Berg et al. | |
| 8,695,549 B2 | 4/2014 | Richter | |
| 9,105,127 B2 | 8/2015 | Choi | |
| 9,202,007 B2 | 12/2015 | Noordvyk et al. | |
| 9,684,997 B2 | 6/2017 | Angelidis et al. | |
| 10,165,928 B2 | 1/2019 | Hunter et al. | |
| 10,178,366 B2 | 1/2019 | Lucas | |
| 2014/0015834 A1* | 1/2014 | Kho | ........................ G06T 15/08 345/426 |
| 2020/0203006 A1* | 6/2020 | Park | ........................ G06T 15/06 |

* cited by examiner

*Primary Examiner* — Chong Wu
(74) *Attorney, Agent, or Firm* — Angela Holt; Frank M. Caprio; Bradley Arant Boult Cummings LLP (57) ABSTRACT

A method to view inside three-dimensional volumetric build data takes in each pixel of the images and evaluates the density, usually represented by color, of the pixel. This evaluation allows the user to set threshold values and return exact representations of the data presented, instead of a culmination of all data along a ray trace. The user can determine the size and placement of a slice plane in relation to the volumetric data, and the software will remove the data in front of the plane so the user can view the internal structure of the data.

11 Claims, 8 Drawing Sheets

VOLUMETRIC SLICER

REFERENCE TO RELATED APPLICATIONS

This application claims priority to Provisional Patent Application U.S. Ser. No. 62/803,838, entitled "Rastered Volume Renderer and Manipulator" and filed on Feb. 11, 2019, which is fully incorporated herein by reference. This application further is a continuation-in-part of, and claims priority to, U.S. non-provisional patent application Ser. No. 16/703,012 entitled "Rastered Volume Renderer and Manipulator" and filed on Dec. 4, 2019, which claimed priority to U.S. Provisional Patent Application No. 62/774,965, filed on Dec. 4, 2018. These applications are fully incorporated herein by reference.

BACKGROUND AND SUMMARY

Conventional methods for viewing sequential two-dimensional data require the user to flip through each image. The user must remember where he or she is in the series of slides relative to the model from which the slides were taken. This limits the user's ability to view the overall picture.

An example of this is the traditional method of viewing medical DICOM (Digital Imaging and Communications in Medicine) images. DICOM images are loaded sequentially into software that allows the user to scroll through using a mouse or keyboard. This method only allows for the images to be displayed as two-dimensional data and many packages only display a single image at a time.

Traditionally, volumetric rendering is done to create clouds or other objects that obstruct light as a function of their density. A method of rendering objects volumetrically is known from the blog Shader Bits (https://shaderbits.com/blog/ray-marched-heightmaps). This prior algorithm produces a volumetric mesh of a cloud using tiled noise textures, a two-dimensional image consisting of multiple images divided into rows and columns, coupled with the density value returned when a virtual ray is traced along an arbitrary vector through the volume representing the space where the cloud is located.

The method according to the present disclosure displays two-dimensional data with three-dimensional volume enabling the end user to easily view abnormalities in sequential data. By adapting the algorithm described above, this method, unlike the prior art, is not concerned with the density from the view of the camera. Instead the current algorithm focuses on the density of the two-dimensional texture array. This two-dimensional texture array can be in the form of a tiled texture with the images in a set row and column, a media file with the images displayed at certain images in time, or any other way to depict a set of two-dimensional images. The method takes in each pixel of the images and evaluates the density, usually represented by color, of the pixel. This evaluation allows the user to set threshold values and return exact representations of the data presented, instead of a culmination of all data along a ray trace.

Since the user has simultaneous access to the two-dimensional tiles while viewing the three-dimensional volume, the user can manipulate the rendered volumetric mesh by adjusting the original tiled texture or texture sequence. This provides the user the ability, which is lacking under current methods, to know where he or she is in the three-dimensional plane when given two-dimensional images.

The disclosed method provides users the ability to see inside of a volumetrically rendered model. The volumetric slicer determines what will be seen based on the location of pixels in relation to the slicer plane, the thresholds of the slicer plane, and the desired width and shape of the final slice.

After utilizing a volumetric rendered mesh, the user determines where to look within the volumetric mesh. The user then inputs threshold values into a material or shader that will determine the color of pixels. The user then selects the size and location of the placement of the slicer within the volumetric data. The software determines which pixels should and should not be shaded. This allows the user to explore internal volume structures and anomalies in arbitrary directions.

BRIEF DESCRIPTION OF THE DRAWINGS

The disclosure can be better understood with reference to the following drawings. The elements of the drawings are not necessarily to scale, emphasis instead being placed upon clearly illustrating the principles of the disclosure. Furthermore, like reference numerals designate corresponding parts throughout the several views.

DETAILED DESCRIPTION

In some embodiments of the present disclosure, the operator may use a virtual controller to manipulate three-dimensional mesh. As used herein, the term "XR" is used to describe Virtual Reality, Augmented Reality, or Mixed Reality displays and associated software-based environments. As used herein, "mesh" is used to describe a three-dimensional object in a virtual world, including, but not limited to, systems, assemblies, subassemblies, cabling, piping, landscapes, avatars, molecules, proteins, ligands, or chemical compounds.

Figure 1:
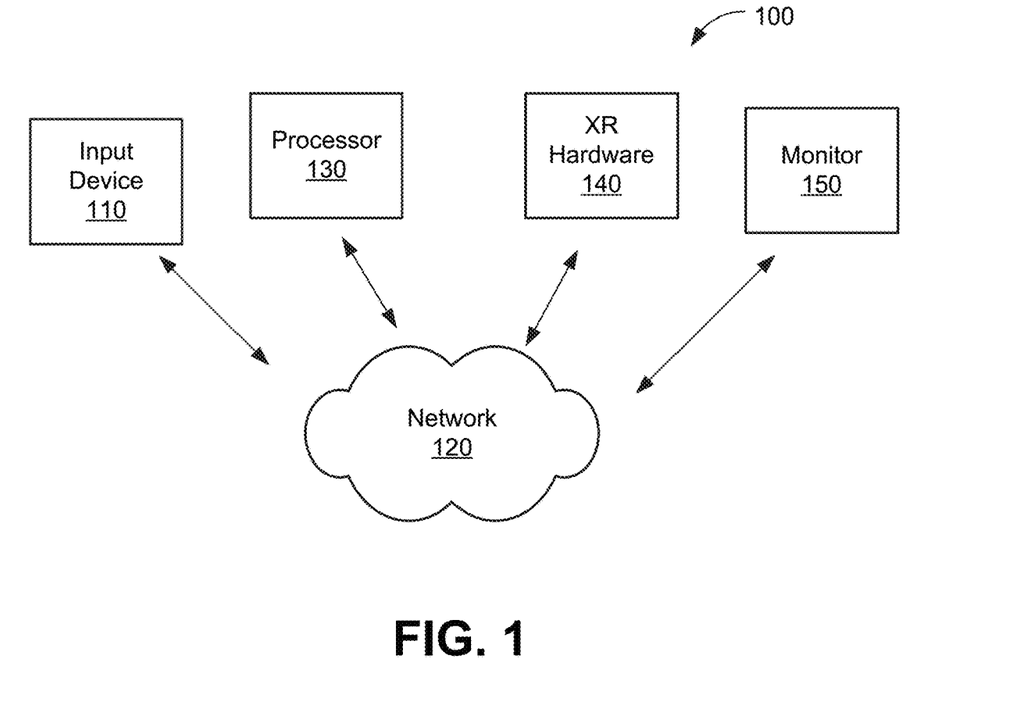
FIG. 1 is a flow diagram depicting a method for mapping two-dimensional and three-dimensional images according to an exemplary embodiment of the present disclosure.

FIG. 1 depicts a system 100 for viewing inside three-dimensional volumetric build data, according to an exemplary embodiment of the present disclosure. The system 100 comprises an input device 110 communicating across a network 120 to a processor 130. The input device 110 may comprise, for example, a keyboard, a switch, a mouse, a joystick, a touch pad and/or other type of interface, which can be used to input data from a user of the system 100. The network 120 may be of any type network or networks known in the art or future-developed, such as the internet backbone, Ethernet, Wifi, WiMax, and the like. The network 120 may be any combination of hardware, software, or both. XR hardware 140 comprises virtual or mixed reality hardware that can be used to visualize a three-dimensional world. A video monitor 150 is used to display a VR space to a user. The input device 110 receives input from the processor 130 and translates that input into an XR event or function call. The input device 110 allows a user to input data to the system 100, by translating user commands into computer commands.

Figure 2:
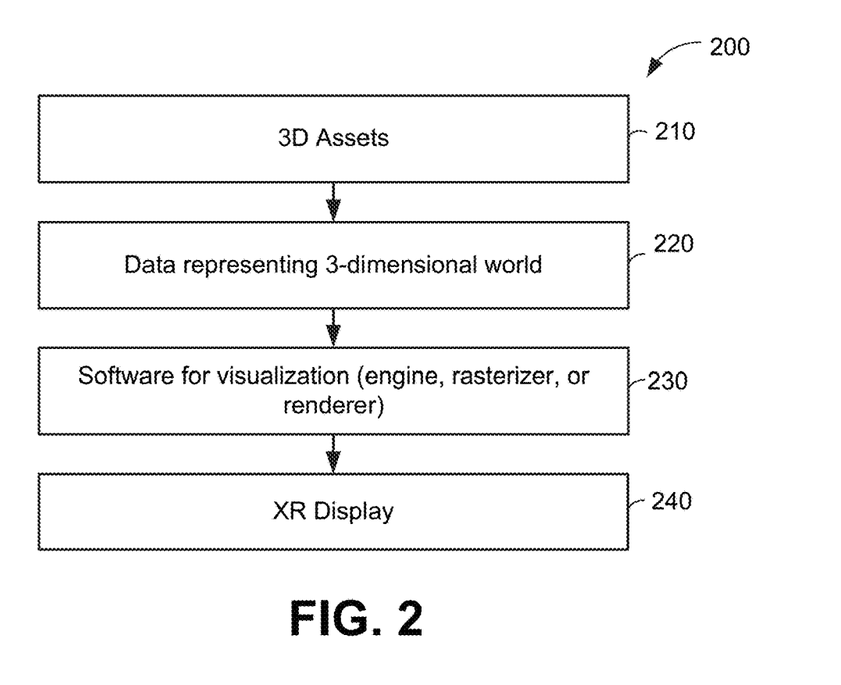
FIG. 2 illustrates the relationship between three-dimensional assets, the data representing those assets, and the communication between that data and the software, which leads to the representation on the XR platform.

FIG. 2 illustrates the relationship between three-dimensional assets 210, the data representing those assets 220, and the communication between that data and the software, which leads to the representation on the XR platform. The three-dimensional assets 210 may be any three-dimensional assets, which are any set of points that define geometry in three-dimensional space.

The data representing a three-dimensional world 220 is a procedural mesh that may be generated by importing three-dimensional models, images representing two-dimensional data, or other data converted into a three-dimensional format. The software for visualization 230 of the data representing a three-dimensional world 220 allows for the processor 130 (FIG. 1) to facilitate the visualization of the data representing a three-dimensional world 220 to be depicted as three-dimensional assets 210 in the XR display 240.

Figure 3:
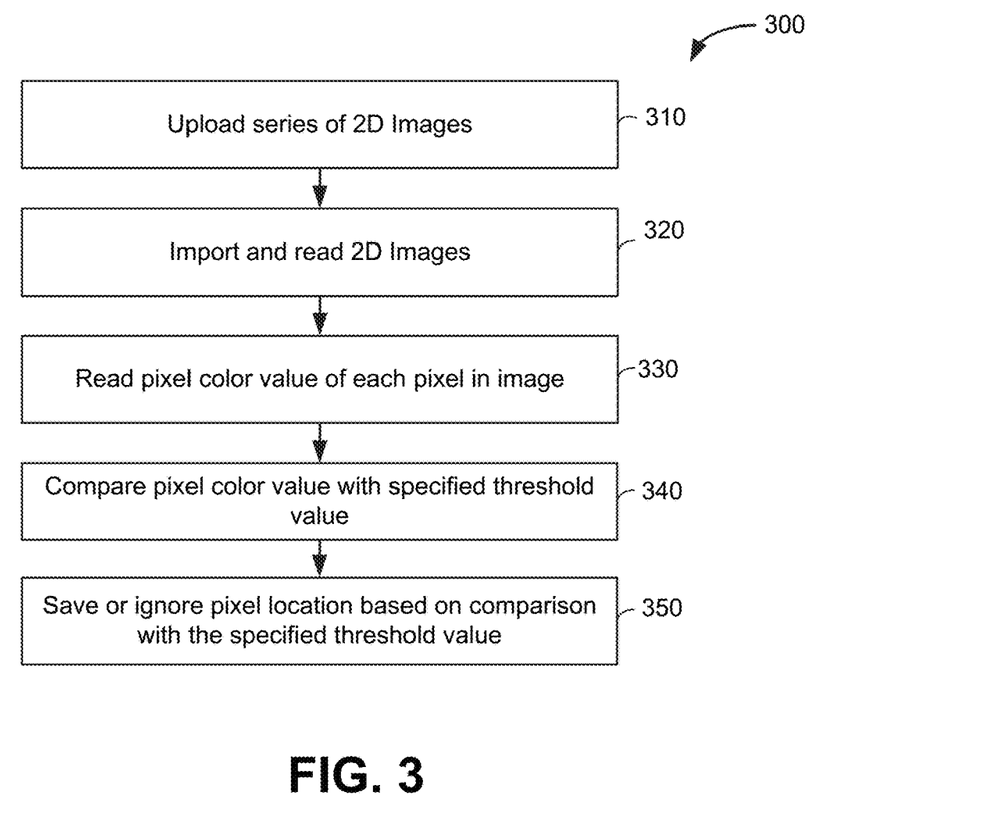
FIG. 3 is a flow diagram depicting a method for importing and manipulating two-dimensional data.

FIG. 3 depicts a method 300 for importing and analyzing data according to a threshold or range of values, in accordance with an exemplary embodiment of the present disclosure. In step 310, the user uploads a series of two-dimensional images to create a three-dimensional mesh. This can be done through a graphical user interface, copying the files into a designated folder, or another upload method. In step 320, the processor imports the two-dimensional images. In step 330, the software loops through the rows and columns of each two-dimensional image and evaluates each pixel and reads the color values of each pixel. In step 340, the software compares each individual pixel color value for the image against a specified threshold value. The threshold value can be user-defined or computer-generated. In step 350, the software saves and tracks the location of pixels with a color value above the specified threshold, or within a range of values. Pixels outside of the desired threshold are ignored, i.e., are not further tracked or displayed. The pixels may be saved in a variety of ways, such as: an array associated with a certain image, a text file, or other save methods. Adjustments can be made in this step to pixel colors or opacity based on user thresholds.

Figure 4:
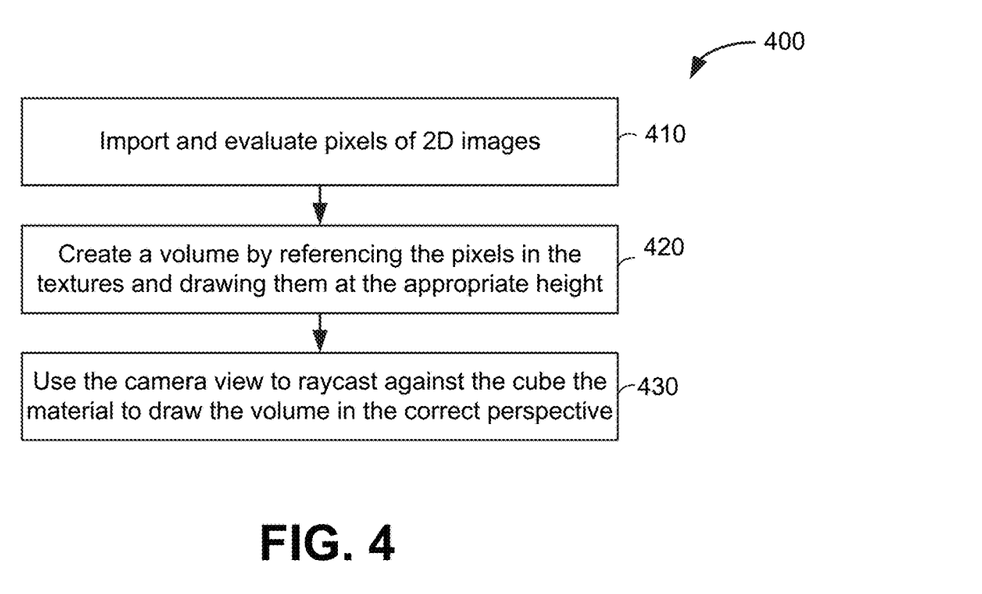
FIG. 4 depicts a method of using pixel evaluation to create volumetric images.

FIG. 4 depicts a method 400 of using pixel evaluation to create volumetric images. In step 410, the volumetric renderer imports and evaluates pixels of 2D images using the method 300 described in FIG. 3. In step 420, the software uses the location of the pixels and the location of the tiled texture to determine the height of each pixel. In this step, creating a master tiled texture material is created by stamping render targets onto sequentially tiled textures, modifying the colors of each tiled texture based on user-defined parameters, setting texture parameters in master tiled material, and adding the master tiled material to a mesh.

In step 430, the software uses casting imaginary rays to determine locations and values for each pixel, it then uses those values to determine the color and location value for each pixel. The method for casting rays is disclosed in U.S. non-provisional patent application Ser. No. 16/703,012, referenced herein.

Figure 5:
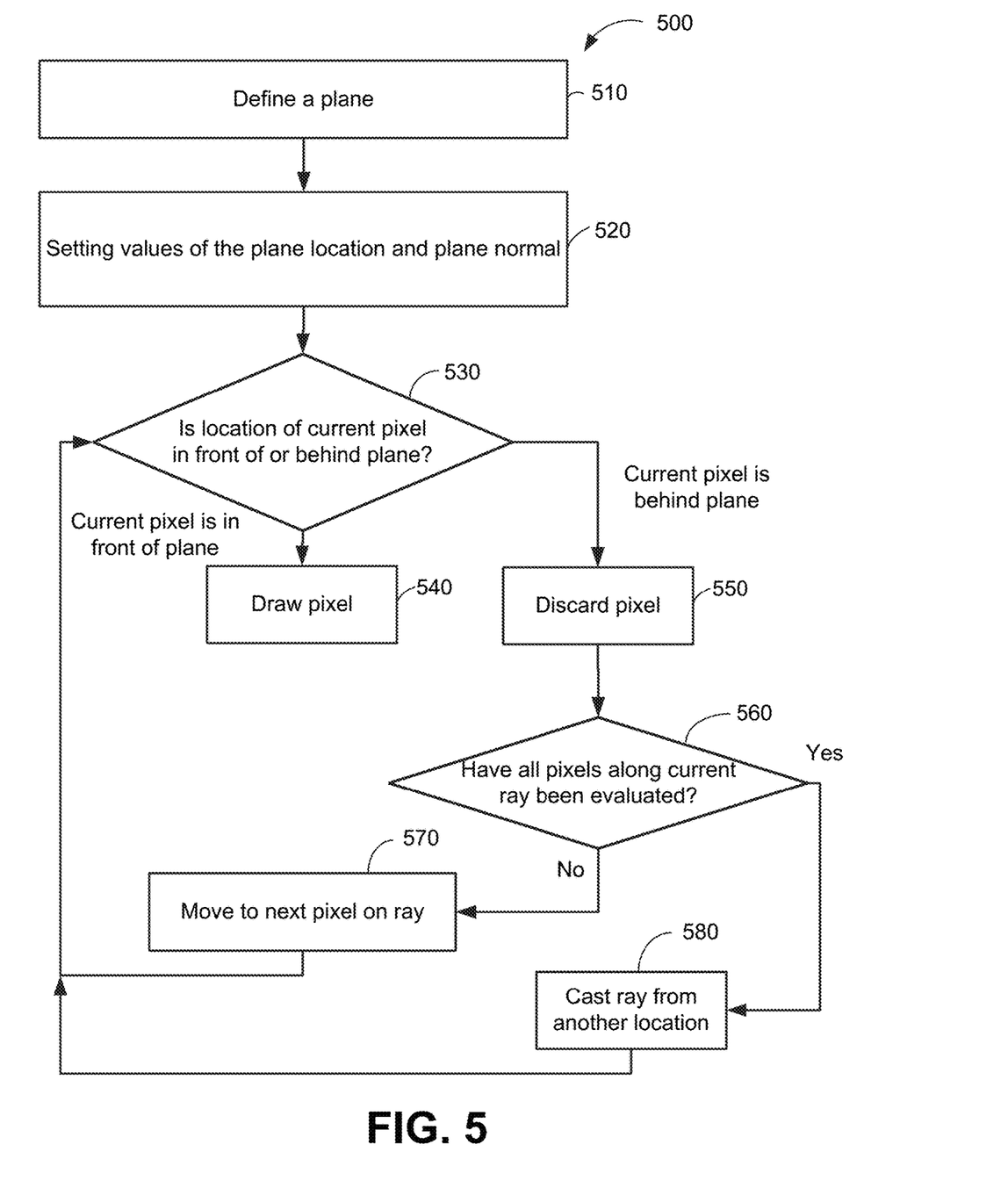
FIG. 5 depicts a method of displaying a slice of a virtual volume, according to an exemplary embodiment of the present disclosure.

FIG. 5 depicts a method 500 of displaying a slice of a virtual volume, according to an exemplary embodiment of the present disclosure. In step 510, the plane to be sliced is defined. A user uses a tool in VR space to identify the desired location to be sliced, and the user-identified location is translated by the system into a plane. In step 520, when the plane is in contact with the rendered volume, the system updates the values for the plane's location and the plane normal. In step 530, the system determines whether the location of the currently evaluated pixel is in front of or behind the plane. In this regard, the system software checks the location of the point on the plane and the plane normal against the current pixel's location by using the dot-product of the vector from the point on the plane to the pixel against the normal of the plane in the object's local space. In step 540, if the location of the plane is greater than or equal to zero, then the pixel is in front of the plane and is drawn. In step 550, if the location in 530 is less than zero, then the pixel is not in front of the plane and is not drawn, i.e., the pixel is discarded. After the pixel is discarded, in step 560 the system queries whether all pixels along the current ray have been evaluated. If so, then in step 580, another imaginary ray is cast from another location, using the method of FIG. 4. If not, then in step 570, the system moves on to evaluate the next pixel along the ray.

Figure 6:
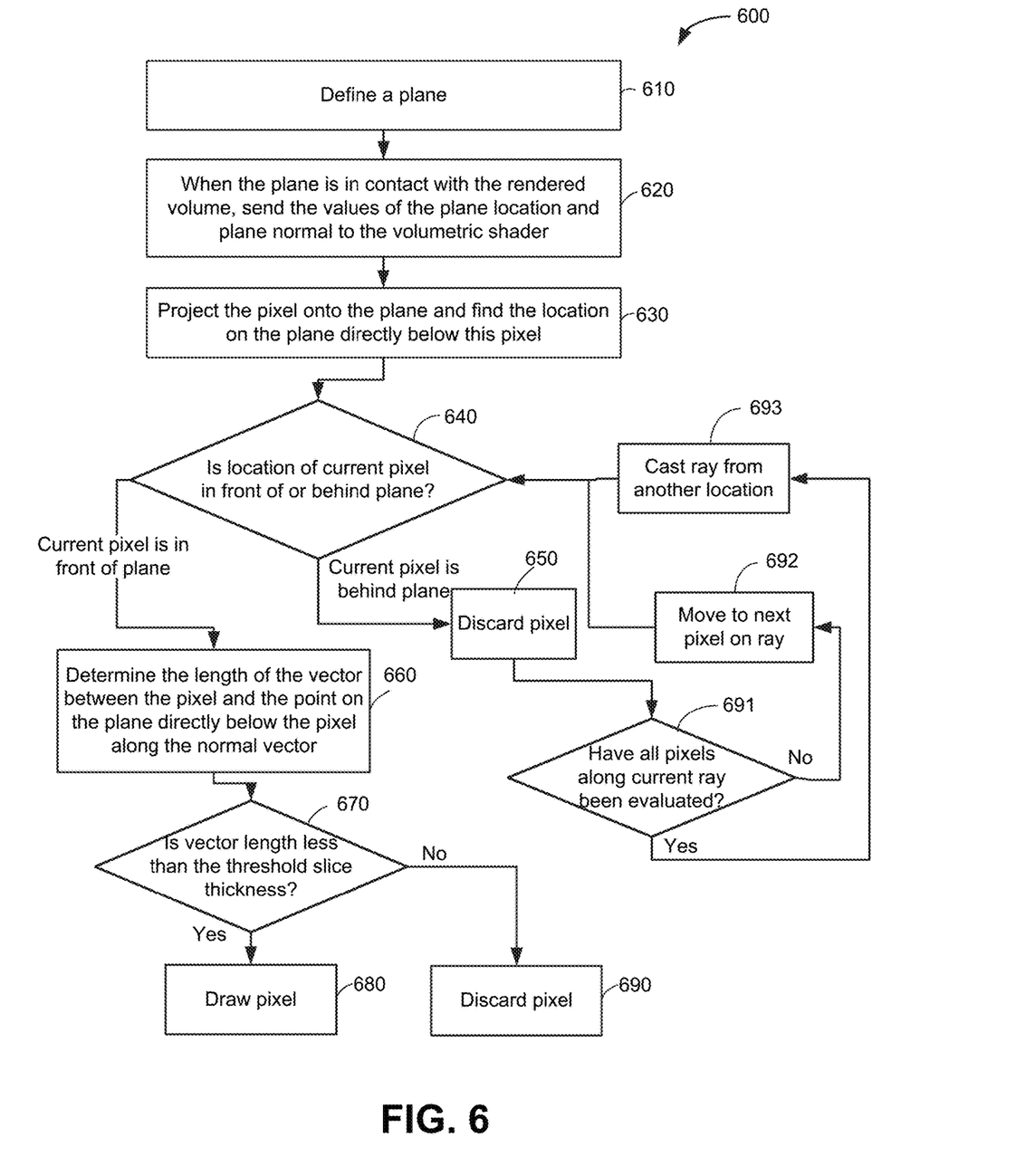
FIG. 6 depicts a method according to another embodiment of the present disclosure, for creating a slice with a user-determined thickness.

FIG. 6 depicts a method 600 according to another embodiment of the present disclosure, for creating a slice with a user-determined thickness. In step 610, the user defines the plane to be sliced in the same manner as step 510 of FIG. 5. In step 620, when the plane is in contact with the rendered volume, the software updates the values for the plane's location and the plane normal. In step 630, the system employs vectors to determine how far away from the plane the pixel is compared to the normal of the plane. In this step, the pixel is projected onto the plane to find the location on the plane directly below this pixel. The software uses the process described in step 530 of the method 500 of FIG. 5, with the projected pixel point found in 630. In step 640, the software determines the pixel location relative to the plane point. In step 650, if the current pixel is behind the plane, then the pixel is discarded. After the pixel is discarded, in step 691 the system queries whether all pixels along the current ray have been evaluated. If so, then in step 693, another imaginary ray is cast from another location, using the method of FIG. 4. If not, then in step 692, the system moves on to evaluate the next pixel along the ray.

In steps 660 and 670, if the pixel is in front of the plane and the distance from the plane point to the pixel is less than or equal to the user-desired slice thickness, then the software determines the magnitude of the vector from the projected plane point to the pixel location. In step 680, the pixel is drawn. If the distance from the plane point to the pixel is greater than the desired threshold slice thickness, the pixel is discarded, in step 690.

The method disclosed herein for rendering pixels relative to the plane allows for an infinite number of axes to be viewed or cut away from the volume. The plane and its movement are in no way restricted to orthogonal axis movement, or movement along any particular arbitrary axis.

Figure 7:
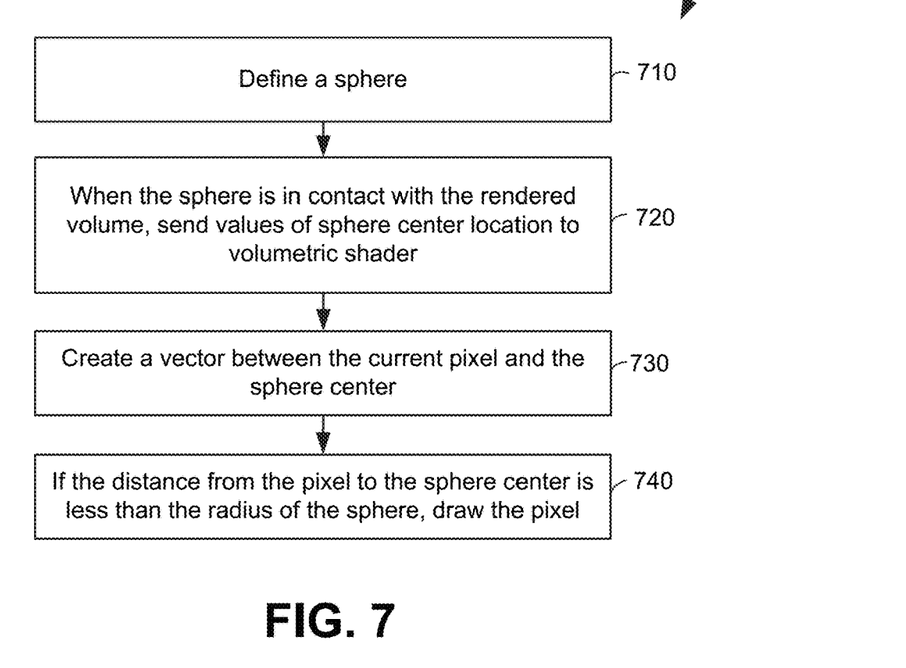
FIG. 7 depicts a method for creating a slice in a sphere, according to an embodiment of the present disclosure.

FIG. 7 depicts a method 700 for creating a slice in a sphere, according to an embodiment of the present disclosure. In step 710, the user defines a sphere. In step 720, when the sphere is in contact with the rendered volume, the software sends the values of the sphere center location into the volumetric shades. In step 730, the software creates a vector between the pixel and the sphere center. In step 740, if the distance from the pixel to the sphere center is less than the radius of the sphere, that pixel is drawn. After the pixels are determined to be drawn or not drawn, the image will show the remaining volume with respect to the selected area.

Figure 8:
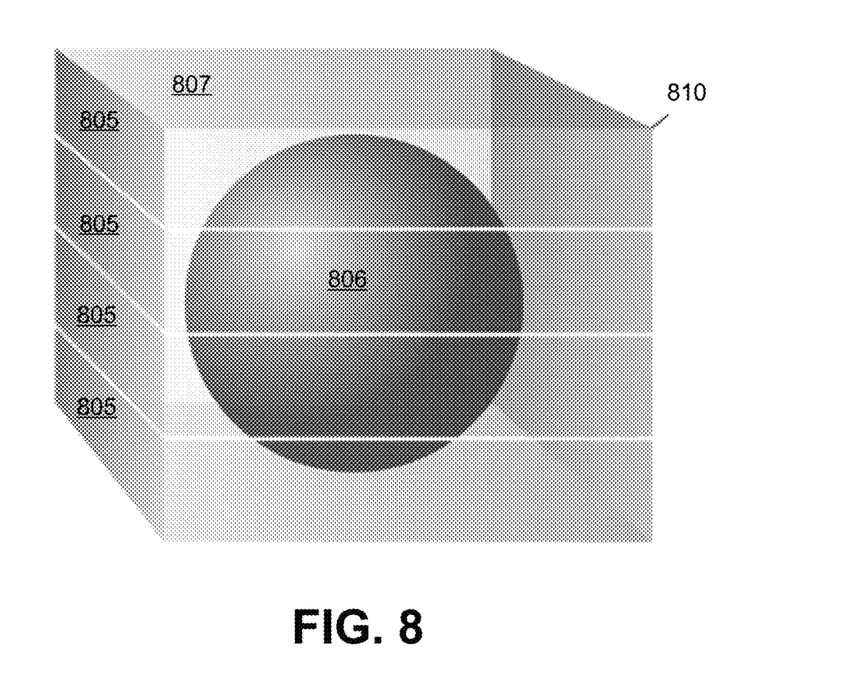
FIG. 8 depicts a volumetric object in the shape of a sphere within a cube.

FIG. 8 depicts a volumetric object 810 in the shape of a sphere 806 within a cube 807. The volumetric object 810 is comprised of image slices 805 displayed together to form an image.

Figure 9:
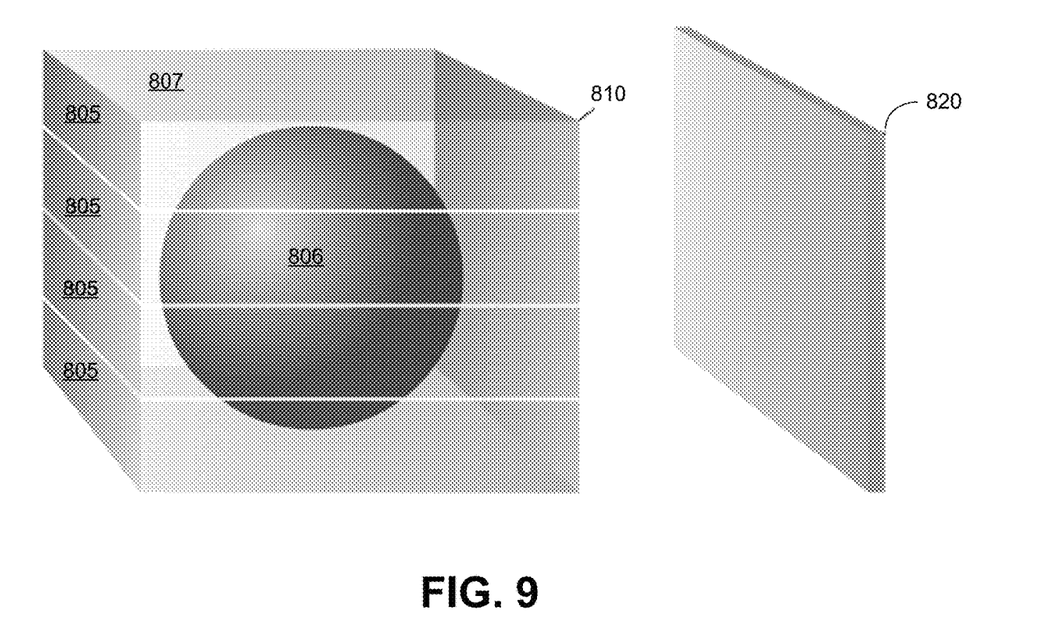
FIG. 9 depicts the volumetric object of FIG. 8, alongside a plane that is defined for slicing into the volumetric object.
Figure 10:
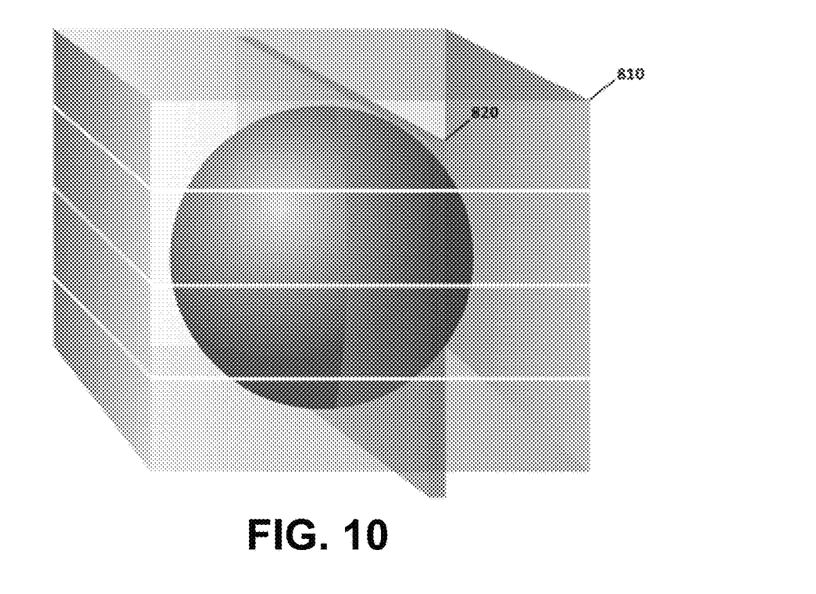
FIG. 10 depicts the slicing plane of FIG. 9 being sliced into the volumetric object of FIG. 9.
Figure 11:
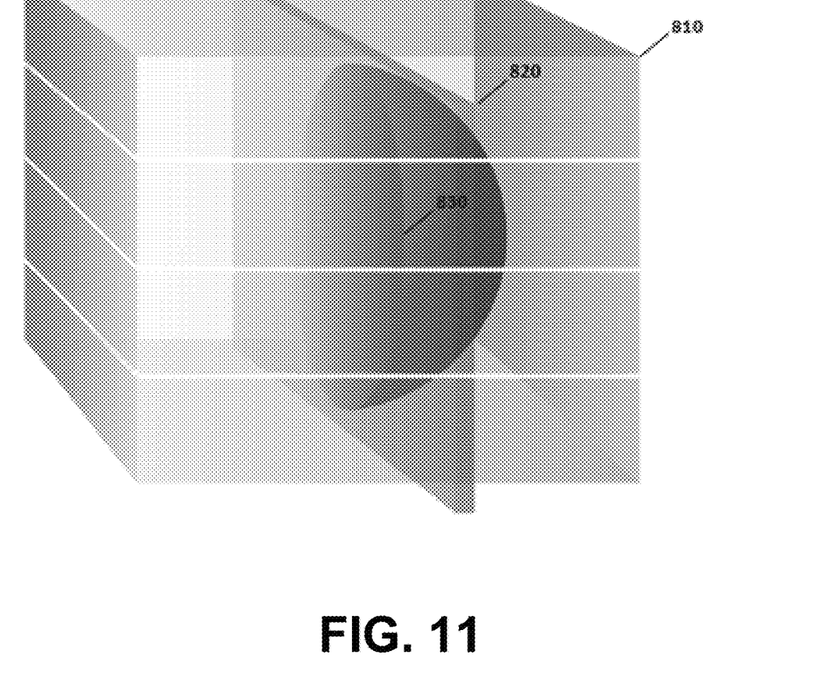
FIG. 11 depicts a sliced volumetric volume.

FIG. 9 depicts the volumetric object 810 of FIG. 8, alongside a plane 820 that is defined for slicing into the volumetric object 810. Using the method of FIG. 5, the user will place the slicing plane 820 within the volumetric object 810, as illustrated in FIG. 10. In this example, the shader that is drawing on the cube is drawing everything in front of the plane. (In this image, "in front of the plane" is to the right of the plane.) The interior of the sphere 830 is depicted by drawing all pixels greater than or equal to the plane location in the direction of the normal, as discussed above with respect to FIG. 5. The resulting image is depicted in FIG. 11.

Figure 12:
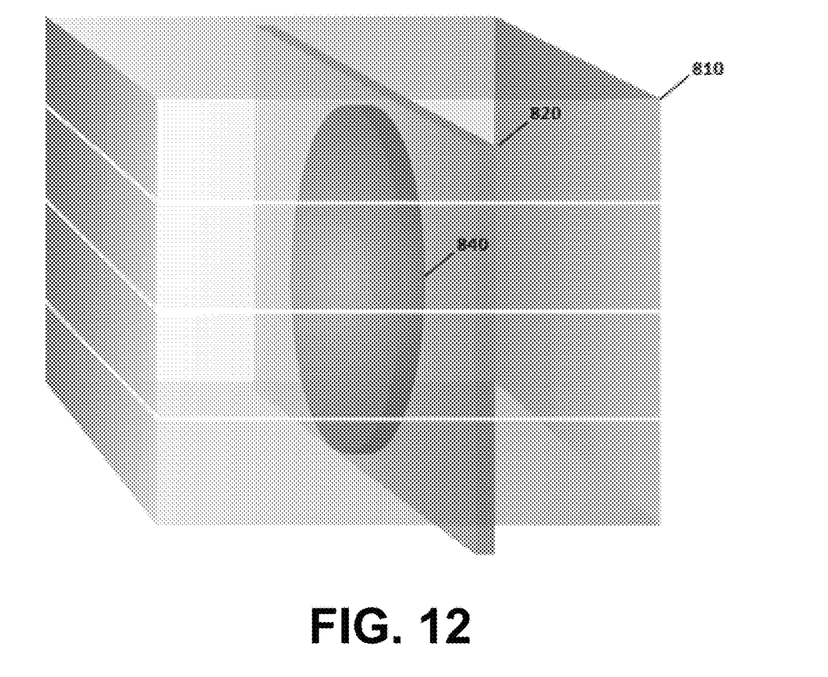
FIG. 12 depicts a volume sliced using the method of FIG. 6, where the slice has a desired thickness.

FIG. 12 depicts a volume 810 sliced using the method of FIG. 6, where the slice 840 has a desired thickness. The slice thickness has been determined by the shader only drawing the pixels in front of the plane in the direction of the normal and less than or equal to the slice thickness distance from the plane.

Figure 13:
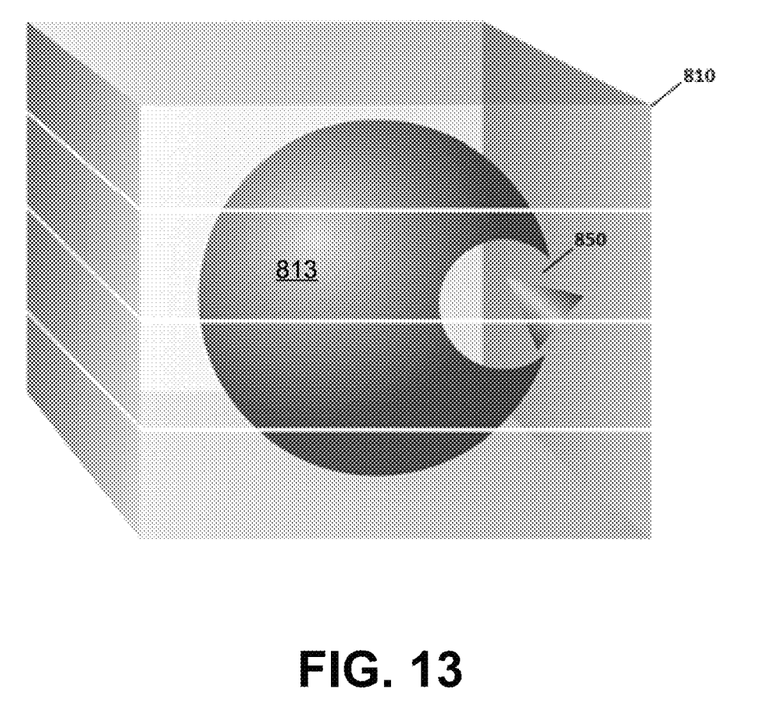
FIG. 13 depicts a sphere being sliced using the method discussed above with respect to FIG. 7.

FIG. 13 depicts a sphere 813 being sliced using the method discussed above with respect to FIG. 7. The user uses a slice tool 850 to cut into the volume in the sphere by using just the sphere's location and a radius away from that point, creating a spherical cutout centered around the point's location. A location on that sphere and a defined radius around that location are used to determine if pixels should be included and drawn or excluded and not drawn.

The embodiments disclosed herein are slicing volumetric objects that are cubes or spheres. However, the methods are not limited to cubes and spheres. Rather, any volumetric object could be sliced using these methods, provided that there is a way to mathematically determine whether pixels are inside or outside of the volume to be sliced.

What is claimed is:

1. A method of visualizing a three-dimensional volume for use in a virtual reality environment, comprising:
    converting two-dimensional images into two-dimensional image textures;
    rendering the two-dimensional image textures into render targets to form a rendered volume;
    creating a master tiled texture material;
    virtually projecting arbitrary rays into a mesh from a face of a virtual camera and displaying, on a display, returned ray values from an intersection of the arbitrary rays with color pixels from the mesh;
    defining a slice plane;
    setting values of the plane location and plane normal;
    using thresholds to determine if pixels should be drawn;
    selecting the size of the slice plane to be placed;
    placing the slice plane within the rendered volume; and
    displaying a remaining volume with respect to a selected area.

2. The method of claim 1, wherein the step of using thresholds to determine if pixels should be drawn comprises determining whether the location of a current pixel is in front of or behind the plane.

3. The method of claim 2, wherein the step of using thresholds to determine if pixels should be drawn further comprises determining if the location of the current pixel is in front of the plane, and if it is, drawing the pixel.

4. The method of claim 3, wherein the step of determining if the location of the current pixel is in front of the plane comprises using the dot-product of a vector from the point on the plane to the current pixel against the normal of the plane.

5. The method of claim 4, wherein if the dot-product of the vector is less than zero, then the pixel is not in front of the plane, and the pixel is discarded.

6. The method of claim 4, wherein if the dot-product of the vector is greater than zero, then the pixel is in front of the plane, and the pixel is drawn.

7. The method of claim 2, wherein the step of using thresholds to determine if pixels should be drawn further comprises determining if the location of the current pixel is behind the plane, and if it is, discarding the pixel.

8. The method of claim 1, further comprising creating a slice with a user-determined thickness.

9. The method of claim 8, wherein the step of creating a slice with a user-determined thickness comprises using vectors to determine how far away from the plane the pixel is compared to the normal of the plane.

10. The method of claim 9, wherein the step of using vectors to determine how far away from the plane the pixel is compared to the normal of the plane comprises projecting the pixel onto the plane to find the location on the plane directly below the pixel, and if the pixel is in front of the plane and the distance from the plane to the pixel is less than or equal to a user-desired slice thickness, draw the pixel.

11. A method of visualizing a three-dimensional volume for use in a virtual reality environment, comprising:
    converting two-dimensional images into two-dimensional image textures;
    rendering the two-dimensional image textures into render targets to form a rendered volume;
    creating a master tiled texture material;
    virtually projecting arbitrary rays into a mesh from a face of a virtual camera and displaying, on a display, returned ray values from an intersection of the arbitrary rays with color pixels from the mesh;
    defining a sphere;
    in response to a determination that the sphere is in contact with the rendered volume, sending values of the sphere center location to a volumetric shader;
    creating a vector between a current pixel and the sphere center;
    if the distance from the current pixel to the sphere center is less than the radius of the sphere, draw the pixel, and if the distance from the current pixel to the sphere center is greater than or equal to the radius of the sphere, discarding the pixel.

\* \* \* \* \*